(12) United States Patent
Miyauchi et al.

(10) Patent No.: US 9,051,430 B2
(45) Date of Patent: Jun. 9, 2015

(54) RESIN-TRANSFER-MOLDABLE TERMINAL-MODIFIED IMIDE OLIGOMER USING 2-PHENYL-4,4'DIAMINODIPHENYL ETHER AND HAVING EXCELLENT MOLDABILITY, MIXTURE THEREOF, VARNISH CONTAINING SAME, AND CURED RESIN THEREOF AND FIBER-REINFORCED CURED RESIN THEREOF MADE BY RESIN TRANSFER MOLDING AND HAVING EXCELLENT HEAT RESISTANCE

(75) Inventors: Masahiko Miyauchi, Settsu (JP); Yuichi Ishida, Chofu (JP); Toshio Ogasawara, Chofu (JP); Rikio Yokota, Sagamihara (JP)

(73) Assignees: KANEKA CORPORATION, Osaka (JP); JAPAN AEROSPACE EXPLORATION AGENCY, Tokyo (JP)

( * ) Notice: Subject to any disclaimer, the term of this patent is extended or adjusted under 35 U.S.C. 154(b) by 0 days.

(21) Appl. No.: 14/005,450

(22) PCT Filed: Mar. 15, 2012

(86) PCT No.: PCT/JP2012/056641
§ 371 (c)(1),
(2), (4) Date: Sep. 16, 2013

(87) PCT Pub. No.: WO2012/128165
PCT Pub. Date: Sep. 27, 2012

(65) Prior Publication Data
US 2014/0011950 A1    Jan. 9, 2014

(30) Foreign Application Priority Data
Mar. 18, 2011 (JP) .................................. 2011-061462

(51) Int. Cl.
C08G 73/10 (2006.01)
C09D 179/08 (2006.01)
(Continued)

(52) U.S. Cl.
CPC .......... *C08G 73/1071* (2013.01); *C09D 179/08* (2013.01); *C08G 73/105* (2013.01); *C08L 79/08* (2013.01); *C08J 5/04* (2013.01); *C08J 2379/08* (2013.01); *C08G 73/1014* (2013.01)

(58) Field of Classification Search
CPC .............................. C08L 79/08; C08G 73/1071
USPC .................... 528/289; 525/420; 428/297.4
See application file for complete search history.

(56) References Cited

U.S. PATENT DOCUMENTS 4,276,407 A * 6/1981 Bilow et al. .................. 528/172
5,397,847 A * 3/1995 Harris et al. .................. 525/432
(Continued)

FOREIGN PATENT DOCUMENTS

JP    2000-219741 A    8/2000
JP    2003-526704 A    9/2003
(Continued)

OTHER PUBLICATIONS

Masahiko Miyauchi et al, "2-phenyl-4, 4'-diaminophenylether o Mochiita Kapton Kozo o Yusuru Kotainetsu Shinki Fuka-gata Polyimide Tanso Sen'i Fukugo Zairyo no Shisaku to Kyodo Bussei", Dai 59 Kai Symposium on Macromolecules Yokosu, vol. 59, No. 2, 2010, pp. 3624-3625; Cited in ISR; with English abstract.
(Continued)

*Primary Examiner* — Tae H Yoon
(74) *Attorney, Agent, or Firm* — Westerman, Hattori, Daniels & Adrian, LLP

(57) ABSTRACT

A novel resin-transfer-moldable terminal-modified imide oligomer having a residue of a tetravalent aromatic tetracarboxylic acid and represented by general formula (1), and the imide oligomer contains an oligomer where n is 0 in an amount of 10% by mole or more.

General Formula (1)

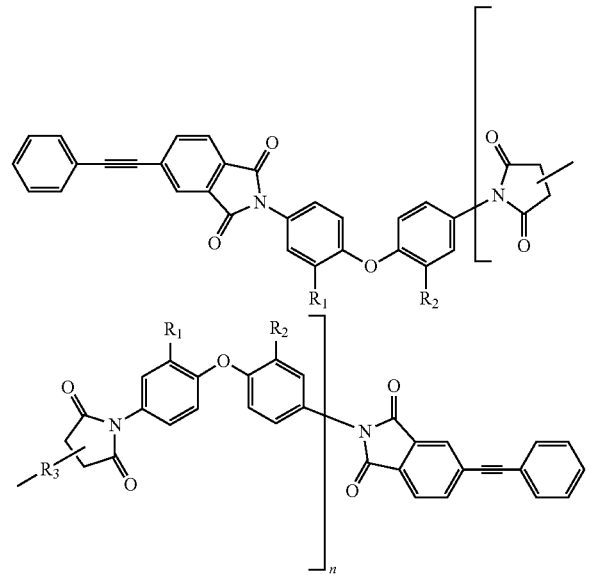

In the formula, $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms; $R_3$ is an aromatic organic group surrounded by four carbonyl groups in the aromatic tetracarboxylic acid, and for a formula where n is 2 or more, $R_a$s are optionally the same as or different from each other; and n is an integer of 0 or more and 6 or less.

4 Claims, 1 Drawing Sheet

(51) Int. Cl.
*C08L 79/08* (2006.01)
*C08J 5/04* (2006.01)

(56) References Cited

U.S. PATENT DOCUMENTS

| | | | |
|---|---|---|---|
| 5,516,876 A * | 5/1996 | Lubowitz et al. | 528/170 |
| 6,281,323 B1 * | 8/2001 | Yokota et al. | 528/170 |
| 8,846,552 B2 * | 9/2014 | Miyauchi et al. | 442/136 |
| 2005/0014925 A1 * | 1/2005 | Yokota et al. | 528/353 |

FOREIGN PATENT DOCUMENTS

| | | | |
|---|---|---|---|
| JP | 2006-312699 A | 11/2006 | |
| JP | 2007-216493 A | 8/2007 | |
| WO | 00/69948 A1 | 11/2000 | |
| WO | 2007/078733 A2 | 7/2007 | |
| WO | 2008/096441 A1 | 8/2008 | |
| WO | WO 2010/027020 A1 * | 3/2010 | |

OTHER PUBLICATIONS

Zuo, H., et al., "Meltable phenylethynyl-capped oligoimide resins derived from 1,4-bis(4-amino-2-trifluoromethylphenosy) benzene and 3,4-oxydianiline", European Polymer Journal, 2007, vol. 43, No. 9, pp. 3892-3903, Fig. 4, Table 1-3, pp. 3902, right column, lines 3 to 12; Cited in ISR.

Liu, H. et al., "Synthesis and Characterization of Phenylethynyl-End-Capped Cooligomides from Fluorinated Dianhydrides 4, 4'-(Hexafluoroisopropylidene) dipthalic anhydride and 4, 4'- (2,2,2-Trifluoro-1-phenylethylidene) dipthalic Anhydride and para- and meta-Phenylene Diamines and Cooligomide Blends with Phenylethynyl-End-Capped Reactive Diluents", Jourlnal Polymer Science, Part A: Polymer Chemistry, 2003, vol. 41, No. 17, pp. 2630-2649; cited in ISR.

Hergenrother, P. M. et al., "Chemistry and properties of imide oligomers end-capped with phenylethnylphthalic anhydrides", Polymer, 1994, vol. 35, No. 22, pp. 4857-4864; cited in specification.

Yokota, Rikio, et al., "Molecular design of heat resistant polymides having excellent processability and high glass transition temperature", High Perform. Polym., 2001, vol. 13, pp. S61-S72; Cited in specification.

International Search Report dated May 22, 2012, issued in corresponding application No. PCT/JP2012/056641.

* cited by examiner

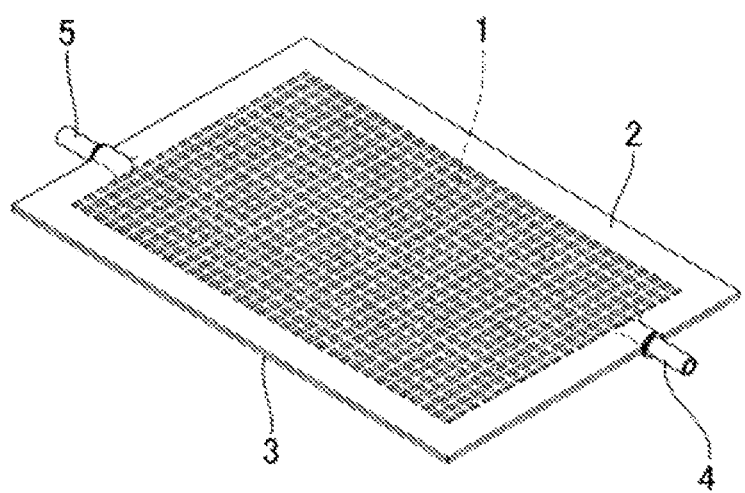

RESIN-TRANSFER-MOLDABLE TERMINAL-MODIFIED IMIDE OLIGOMER USING 2-PHENYL-4,4'DIAMINODIPHENYL ETHER AND HAVING EXCELLENT MOLDABILITY, MIXTURE THEREOF, VARNISH CONTAINING SAME, AND CURED RESIN THEREOF AND FIBER-REINFORCED CURED RESIN THEREOF MADE BY RESIN TRANSFER MOLDING AND HAVING EXCELLENT HEAT RESISTANCE

TECHNICAL FIELD

The present invention relates to a terminal-modified imide oligomer, a varnish, and a cured resin thereof, and in particular, relates to a resin-transfer-moldable terminal-modified imide oligomer employed in members usable in various fields requiring easy moldability and high heat resistance, for example, for aircrafts and equipment for aerospace industry.

BACKGROUND ART

An aromatic polyimide, which has the highest level of heat resistance among polymers and also has excellent mechanical properties, electric properties, and other properties, is used as a material in various fields.

However, the aromatic polyimide, which typically has poor processability, is unsuitable especially for melt process and as a matrix resin of a fiber-reinforced composite material. To address this, imide oligomers having terminals modified with a thermal cross-linkable group are disclosed. Among them, imide oligomers having terminals modified with 4-(2-phenylethynyl)phthalic anhydride are believed to have excellent balance of moldability, heat resistance, and mechanical properties, and examples of the imide oligomer are disclosed in Patent Documents 1 to 3 and Non-Patent Documents 1 and 2.

Patent Document 1 has an object to provide a highly practical terminal-modified imide oligomer capable of producing a cured product having good heat resistance and mechanical properties and a cured product of the imide oligomer, and discloses a terminal-modified imide oligomer having a logarithmic viscosity number of 0.05 to 1 and obtained by reacting 2,3,3',4'-biphenyltetracarboxylic dianhydride with a folded and non-planar structure, an aromatic diamine compound, and 4-(2-phenylethynyl)phthalic anhydride and a cured product of the imide oligomer. However, the terminal-modified imide oligomer has a room for improvement in the solubility in an organic solvent and the preservability of a varnish of the imide oligomer.

Patent Document 2 discloses a terminal-modified imide oligomer for infusion and resin transfer molding. In order to impart high flowability to the imide oligomer, a method of reducing the degree of polymerization or of using a diamine having a soft structure is employed. The method improves the solubility of the terminal-modified imide oligomer but is likely to largely lower the glass transition temperature of a terminal cured product.

Patent Document 3 discloses a terminal-modified imide oligomer that is obtained by using a diamine monomer having a sterically bulky structure, but such an imide oligomer typically gives a small elongation at break and is likely to produce a fragile product. Those disclosed in Non-Patent Documents 1 and 2 also achieve insufficient flowability during molding and insufficient physical properties of a cured product after molding.

CITATION LIST

Patent Literatures

Patent Document 1: JP-A No. 2000-219741
Patent Document 2: JP-T No. 2003-526704
Patent Document 3: JP-A No. 2006-312699

Non-Patent Literatures

Non-Patent Document 1: P. M. Hergenrother and J. G. Smith Jr., Polymer, 35, 4857 (1994)
Non-Patent Document 2: R. Yokota, S. Yamamoto, S. Yano, T. Sawaguchi, M. Hasegawa, H. Yamaguchi, H. Ozawa, and R. Sato, High Perform. Polym., 13, S61 (2001)

SUMMARY OF INVENTION

Technical Problem

The present invention has an object to provide a novel terminal-modified imide oligomer having excellent moldability such as low melt viscosity and suitable for resin transfer molding, a mixture thereof, a varnish thereof, and a cured resin and a fiber-reinforced cured resin produced by resin transfer molding of the terminal-modified imide oligomer or a related material and having high thermal and mechanical properties such as heat resistance, elasticity modulus, tensile strength, and elongation.

Solution to Problem

As a result of intensive studies in order to solve the problems, the inventors of the present invention have found that an aromatic diamine including a 2-phenyl-4,4'-diaminodiphenyl ether is used to yield a terminal-modified imide oligomer including a particular structure having a residue of a tetravalent aromatic tetracarboxylic acid, the imide oligomer obtains sufficiently high melt flowability and is readily subjected to resin transfer molding, and a cured resin of the imide oligomer obtains high heat resistance and sufficient mechanical strength, and the invention has been accomplished.

That is to say, aspects of the present invention are as below.
(1) A resin-transfer-moldable terminal-modified imide oligomer having a residue of a tetravalent aromatic tetracarboxylic acid and represented by General Formula (1) contains an oligomer where n is 0 in an amount of 10% by mol or more.

[C.1]

General Formula (1)

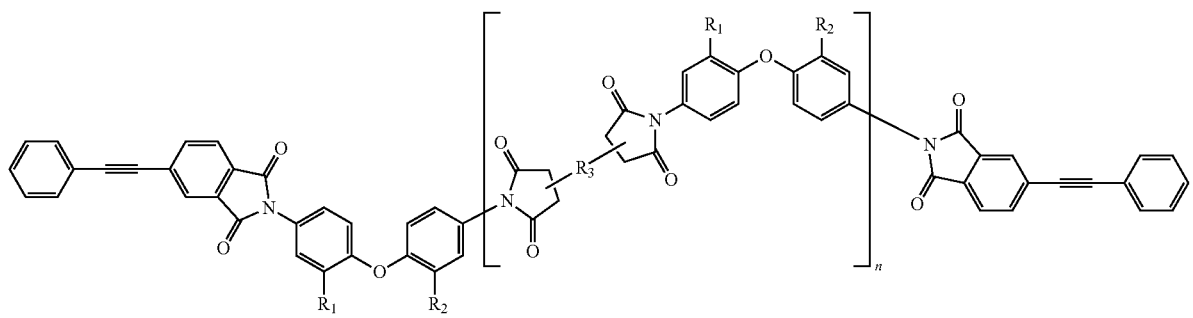

(In the formula, $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms; $R_3$ is an aromatic organic group surrounded by four carbonyl groups in the aromatic tetracarboxylic acid, and for a formula where n is 2 or more, $R_3$s are optionally the same as or different from each other; and n is an integer of 0 or more and 6 or less)

Here, the aromatic organic group is an organic group having an aromatic ring.

(2) In the resin-transfer-moldable terminal-modified imide oligomer according to the aspect (1), the aromatic tetracarboxylic acid includes a 1,2,4,5-benzenetetracarboxylic acid and the imide oligomer is an oligomer represented by General Formula (2).

General Formula (2)

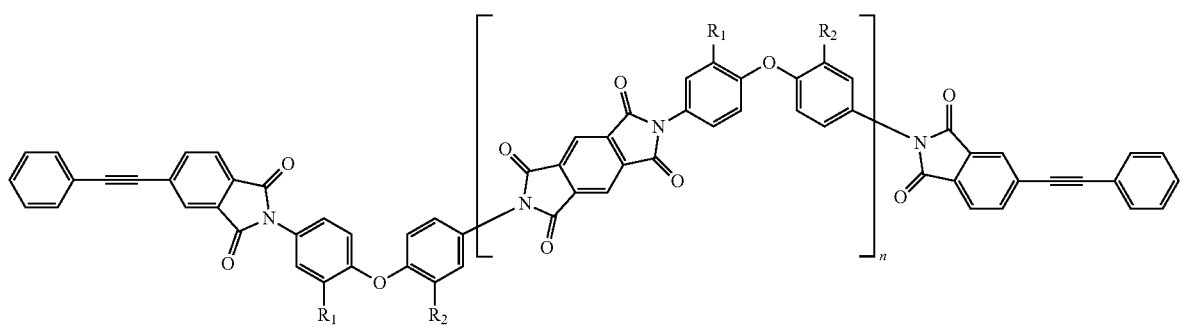

[C.2]

(In the formula, $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms; and n is an integer of 0 or more and 6 or less)

(3) In the resin-transfer-moldable terminal-modified imide oligomer according to the aspect (1), the aromatic tetracarboxylic acid includes a 3,3',4,4'-biphenyltetracarboxylic acid and the imide oligomer is an oligomer represented by General Formula (3).

[C.3]

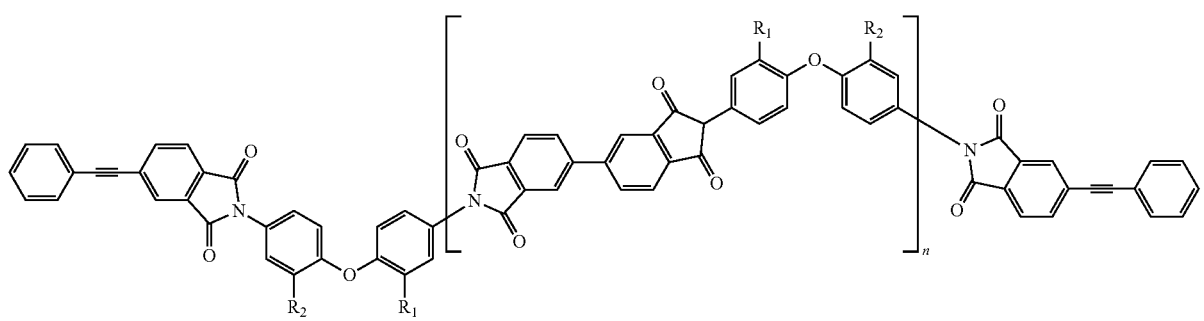

General Formula (3)

(In the formula, $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms; and n is an integer of 0 or more and 6 or less)

(4) In the resin-transfer-moldable terminal-modified imide oligomer according to the aspect (1), the aromatic tetracarboxylic acid includes a 1,2,4,5-benzenetetracarboxylic acid and a 3,3',4,4'-biphenyltetracarboxylic acid.

(5) A resin-transfer-moldable terminal-modified imide oligomer mixture includes the resin-transfer-moldable terminal-modified imide oligomer according to any of the aspects (1) to (4) and a resin-transfer-moldable terminal-modified imide oligomer represented by General Formula (1) where n is 0.

(6) A resin-transfer-moldable terminal-modified imide oligomer mixture includes the resin-transfer-moldable terminal-modified imide oligomer according to the aspect (1) and a terminal-modified imide oligomer represented by General Formula (4) and having a minimum melt viscosity of 1 Pa·sec or less determined with a rheometer.

[C.4]

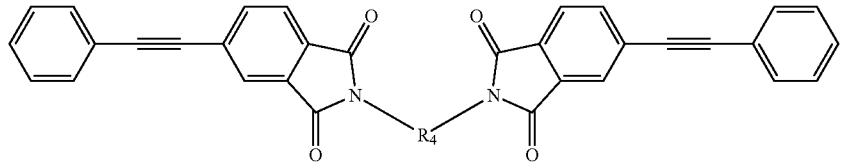

General Formula (4)

(In the formula, $R_4$ is an aromatic organic group surrounded by two amino groups in an aromatic diamine acid)

(7) The resin-transfer-moldable terminal-modified imide oligomer according to any of the aspects (1) to (4) or the resin-transfer-moldable terminal-modified imide oligomer mixture according to the aspect (5) or (6) has a melt viscosity of 3 Pa·sec or less at 280 to 350° C.

(8) A method for producing a resin-transfer-moldable terminal-modified imide oligomer mixture includes adding a terminal-modified imide oligomer represented by General Formula (4) to a resin-transfer-moldable terminal-modified imide oligomer having a residue of a tetravalent aromatic tetracarboxylic acid and represented by General Formula (1).

[C.5]

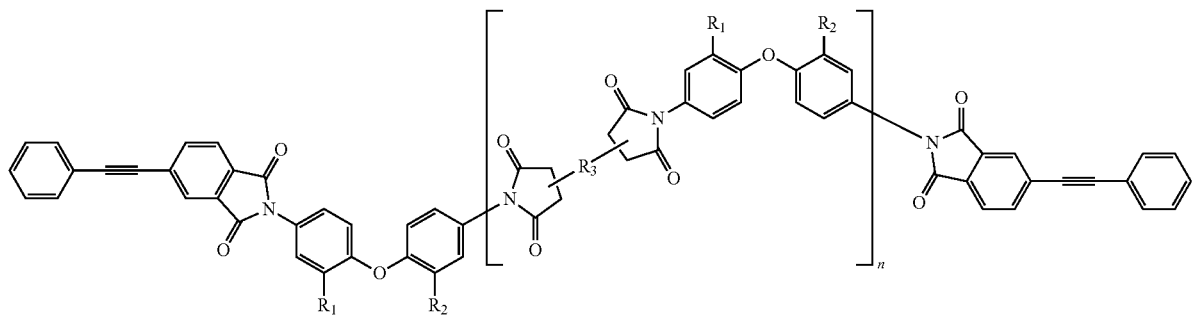

General Formula (1)

(In the formula, $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms; $R_3$ is an aromatic organic group surrounded by four carbonyl groups in the aromatic tetracarboxylic acid, and for a formula where n is 2 or more, $R_3$s are optionally the same as or different from each other; and n is an integer of 0 or more and 6 or less)

[C.6]

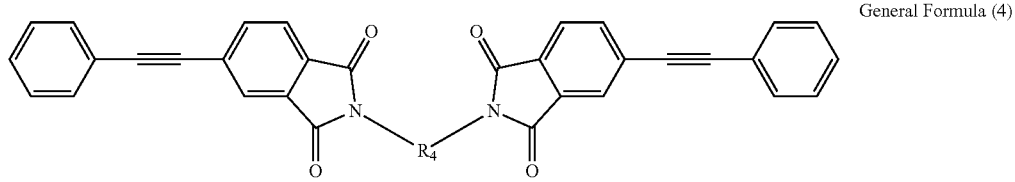

General Formula (4)

(In the formula, $R_4$ is an aromatic organic group surrounded by two amino groups in an aromatic diamine acid)

(9) A varnish includes the resin-transfer-moldable terminal-modified imide oligomer or the resin-transfer-moldable terminal-modified imide oligomer mixture according to any of the aspects (1) to (7).

(10) A cured resin is obtained by resin transfer molding, the resin transfer molding being performed by transferring the resin-transfer-moldable terminal-modified imide oligomer or the resin-transfer-moldable terminal-modified imide oligomer mixture according to any of the aspects (1) to (7) or the varnish according to the aspect (9) into a mold in a molten state and thermal curing the component.

(11) The cured resin according to the aspect (10) has a glass transition temperature (Tg) of 300° C. or more.

(12) The cured resin according to the aspect (10) has a tensile elongation at break of 8% or more.

(13) A fiber-reinforced cured resin is obtained by resin transfer molding, the resin transfer molding being performed by impregnating a fiber previously disposed in a mold with the resin-transfer-moldable terminal-modified imide oligomer or the resin-transfer-moldable terminal-modified imide oligomer mixture according to any of the aspects (1) to (7) or the varnish according to the aspect (9) in a molten state and thermal curing the component.

(14) The fiber-reinforced cured resin according to the aspect (13) has a glass transition temperature (Tg) of 300° C. or more.

Advantageous Effects of Invention

The present invention can provide a novel resin-transfer-moldable terminal-modified imide oligomer having excellent moldability such as low melt viscosity, a mixture thereof, a varnish containing the same, and a cured resin thereof having high heat resistance and high mechanical properties such as tensile elastic modulus, tensile breaking strength, and tensile elongation at break. Employing resin transfer molding can relax the molding condition (simplify the molding method) and enables the production of a cured resin having very high heat resistance and very high strength.

Resin transfer molding of impregnating a fiber with the terminal-modified imide oligomer of the present invention, a mixture thereof, or a varnish containing the same and thermal curing the composition generates no water due to imidization during the thermal curing. This eliminates the possibility of generating large pores in the fiber layer or extremely reduces the possibility. Therefore, the present invention can produce a fiber-reinforced cured resin having excellent reliability.

BRIEF DESCRIPTION OF THE DRAWINGS

FIG. 1 is a schematic view showing a forming die for molding a fiber-reinforced cured resin in an example.

DESCRIPTION OF EMBODIMENTS

Embodiments of the present invention will be described below.

<Resin-Transfer-Moldable Terminal-Modified Imide Oligomer>

The present invention is a resin-transfer-moldable terminal-modified imide oligomer having a residue of a tetravalent aromatic tetracarboxylic acid and represented by General Formula (1) and the imide oligomer contains an oligomer where n is 0 in an amount of 10% by mol or more.

General Formula (1)

[C.7]

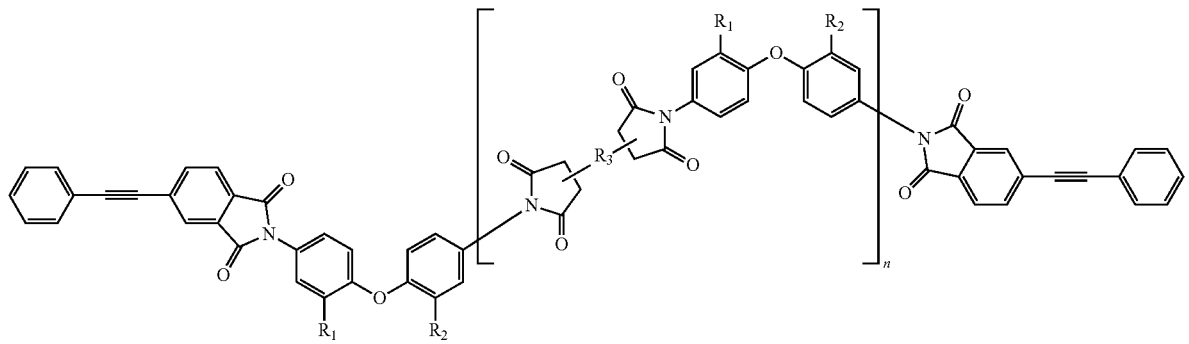

In General Formula (1), $R_1$ and $R_2$ are a hydrogen atom or an aromatic hydrocarbon group having 6 to 10 carbon atoms and one of $R_1$ and $R_2$ is the aromatic hydrocarbon group having 6 to 10 carbon atoms. $R_3$ is an aromatic organic group surrounded by four carbonyl groups in the aromatic tetracarboxylic acid, and for a formula where n is 2 or more, $R_3$s are optionally the same as or different from each other. n is an integer of 0 or more and 6 or less. The aromatic hydrocarbon group having 6 to 10 carbon atoms is not particularly limited and is preferably an aromatic hydrocarbon group (phenyl group) having 6 carbon atoms. This achieves excellent oxidation resistance (chemical bond stability) during a continuous use at high temperature and increases the weight reduction start temperature associated with oxidation (increases heat resistance). In addition, this can easily suppress the rotation of the 4,4'-diaminodiphenyl ether molecule around the oxygen atom to thus improve the physical heat resistance (glass transition temperature).

In the present invention, the aromatic tetracarboxylic acid capable of constituting the residue of a tetravalent aromatic tetracarboxylic acid included in General Formula (1) is not particularly limited. The aromatic organic group represented by $R_3$ in General Formula (1) and surrounded by four carbonyl group of the aromatic tetracarboxylic acid is preferably an organic group having 6 to 30 carbon atoms, more preferably an organic group having 6 to 18 carbon atoms, and even more preferably an organic group having 6 to 12 carbon atoms. The aromatic organic group is preferably a group having 6 to 30 carbon atoms and hydrogen atoms, more preferably a group having 6 to 18 carbon atoms and hydrogen atoms, and even more preferably a group having 6 to 12 carbon atoms and hydrogen atoms.

Specific examples of the aromatic organic group include 1,2,4,5-benzenetetracarboxylic acids, 3,3',4,4'-biphenyltetracarboxylic acids, bis(3,4-carboxyphenyl)ethers, 3,3',4,4'-benzophenonetetracarboxylic acids, 2,3,3',4'-biphenyltetracarboxylic acids, 2,2',3,3'-biphenyltetracarboxylic acids, 2,2-bis(3,4-dicarboxyphenyl)methanes, bis(3,4-carboxyphenyl) ethers, and 1,2,3,4-benzenetetracarboxylic acids. These may be used singly or in combination of two or more of them. Accordingly, for example, for an imide oligomer containing an oligomer represented by General Formula (1) where n is 2 or more, the resin-transfer-moldable terminal-modified imide oligomer of the present invention can include an oligomer having one type of $R_3$ or an oligomer having two or more types of $R_3$s in General Formula (1).

Among the aromatic tetracarboxylic acids, in order to further exert advantageous effects of the invention, a 1,2,4,5-benzenetetracarboxylic acid and/or a 3,3',4,4'-biphenyltetracarboxylic acid is preferably used.

Examples of the 1,2,4,5-benzenetetracarboxylic acid include 1,2,4,5-benzenetetracarboxylic acid and acid derivatives such as 1,2,4,5-benzenetetracarboxylic dianhydride (PMDA) and esters or salts of 1,2,4,5-benzenetetracarboxylic acid, and 1,2,4,5-benzenetetracarboxylic dianhydride is preferred.

In particular, an aromatic polyimide oligomer using a 1,2,4,5-benzenetetracarboxylic acid has strong intermolecular interaction due to the rigid and flat structure of pyromellitimide and thus is supposed to provide a film and a cured resin having high heat resistance and high strength. However, due to the strong interaction of the pyromellitimide, an imide oligomer has no melt flowability and is likely to fail to be melted and to be insoluble in a solvent. Until now, there has been no report on a terminal-modified imide oligomer that can be molded into a cured resin having a glass transition temperature of 270° C. or more and has high solvent solubility.

In such a circumstance, the present invention uses an aromatic diamine including a 2-phenyl-4,4'-diaminodiphenyl ether to produce a particular structure and this enables the production of a desired terminal-modified imide oligomer even with a 1,2,4,5-benzenetetracarboxylic acid while utilizing its characteristics.

A specific example of the resin-transfer-moldable terminal-modified imide oligomer in which the aromatic tetracarboxylic acid includes a 1,2,4,5-benzenetetracarboxylic acid is a particular resin-transfer-moldable terminal-modified imide oligomer having a residue of a tetravalent aromatic tetracarboxylic acid and represented by General Formula (2).

Examples of the 3,3',4,4'-biphenyltetracarboxylic acid include 3,3',4,4'-biphenyltetracarboxylic acid and acid derivatives such as 3,3',4,4'-biphenyltetracarboxylic dianhydride (s-BPDA) and esters or salts of 3,3',4,4'-biphenyltetracarboxylic acid, and 3,3',4,4'-biphenyltetracarboxylic dianhydride is preferred.

The present invention enables the production of a desired terminal-modified imide oligomer by using a 3,3',4,4'-biphenyltetracarboxylic acid to thus utilize excellent characteristics of the 3,3',4,4'-biphenyltetracarboxylic acid that have not been reported, as with the 1,2,4,5-benzenetetracarboxylic acids.

A specific example of the resin-transfer-moldable terminal-modified imide oligomer in which the aromatic tetracarboxylic acid is a 3,3',4,4'-biphenyltetracarboxylic acid is a particular resin-transfer-moldable terminal-modified imide oligomer represented by General Formula (3).

Examples of the bis(3,4-carboxyphenyl)ether include bis(3,4-carboxyphenyl)ether and acid derivatives such as bis(3,4-carboxyphenyl)ether dianhydride (s-ODPA) and esters or salts of bis(3,4-carboxyphenyl)ether, and bis(3,4-carboxyphenyl)ether dianhydride is preferred because the terminal-modified imide oligomer is readily prepared.

Examples of the 3,3',4,4'-benzophenonetetracarboxylic acid include 3,3',4,4'-benzophenonetetracarboxylic dianhydride (BTDA);

examples of the 2,3,3',4'-biphenyltetracarboxylic acid include 2,3,3',4'-biphenyltetracarboxylic dianhydride (a-BPDA);

examples of the 2,2',3,3'-biphenyltetracarboxylic acid include 2,2',3,3'-biphenyltetracarboxylic dianhydride (1-BPDA);

examples of the 2,2-bis(3,4-dicarboxyphenyl)methane include 2,2-bis(3,4-dicarboxyphenyl)methane dianhydride;

examples of the bis(3,4-carboxyphenyl)ether include bis(3,4-carboxyphenyl)ether dianhydride; and examples of the 1,2,3,4-benzenetetracarboxylic acid include 1,2,3,4-benzenetetracarboxylic dianhydride; but these are non-limiting examples.

In the present invention, the resin-transfer-moldable terminal-modified imide oligomer having a residue of a tetravalent aromatic tetracarboxylic acid and represented by General Formula (1) contains an oligomer where n is 0 in an amount of 10% by mol or more. This achieves excellent melt flowability at high temperature and improves resin transfer moldability. The amount of the oligomer where n is 0 is preferably 20% by mol or more and more preferably 30% by mol or more. The oligomer where n is 0 may be contained in an amount of 10% by mol or more and is preferably included in an amount of 50% by mol or less in order to maintain high toughness.

Examples of the method of determining the amount of the oligomer where n is 0 contained in the particular resin-transfer-moldable terminal-modified imide oligomer having a residue of a tetravalent aromatic tetracarboxylic acid and represented by General Formula (1) of the present invention include nuclear magnetic resonance (NMR) analysis and infrared (IR) spectroscopic analysis, but the simplest and most precise method is gel permeation chromatography (GPC) by which the amount is calculated from the area ratio of peaks of oligomers having various n numbers in an obtained chart.

In the present invention, 4-(2-phenylethynyl)phthalic anhydride is preferably used as an unsaturated acid anhydride for terminal-modification (end-capping) in order to exert high toughness and oxidation resistance at 200° C. or more of a resin after curing. This forms an addition polymerizable unsaturated terminal group derived from 4-(2-phenylethynyl)phthalic anhydride in the resin-transfer-moldable terminal-modified imide oligomer.

The molar ratio of the 4-(2-phenylethynyl)phthalic anhydride used for the production of the resin-transfer-moldable terminal-modified imide oligomer of the present invention is preferably 5 to 200% by mol and more preferably 5 to 150% by mol based on the total molar amount of acids.

The resin-transfer-moldable terminal-modified imide oligomer of the present invention preferably has a melt viscosity of 3 Pa·sec or less at 280 to 350° C.

The resin-transfer-moldable terminal-modified imide oligomer of the present invention is preferably soluble in an amount of 10% by weight or more and more preferably 30% by weight or more in terms of solid content in an organic solvent used for synthesis of the imide oligomer, particularly, in N-methyl-2-pyrrolidone (NMP), at room temperature from the viewpoint of synthesis described later.

The resin-transfer-moldable terminal-modified imide oligomer of the present invention can be produced, for example, in the below procedure, but the production method is not limited to the below production method and other methods may be used for the production.

The terminal-modified imide oligomer of the present invention can be obtained by, for example, as follows: the aromatic tetracarboxylic acid, an aromatic diamine including 2-phenyl-4,4'-diaminodiphenyl ether, and 4-(2-phenylethynyl)phthalic anhydride are used so that the total amount of amino group is twice or more the total amount of acid anhydride group in the whole components (for adjacent dicarboxylic acid groups, 2 mol of carboxy group is regarded as 1 mol of acid anhydride group); each component is polymerized in a solvent at a reaction temperature of about 100° C. or less, particularly, 80° C. or less to yield an "oligomer having an amide-acid bond" (amide acid oligomer); and next, the amide acid oligomer (also called amic acid oligomer) is dehydrated and cyclized by a method of adding an imidizing agent at a low temperature of about 0 to 140° C. or by a method of heating the oligomer at a high temperature of 140 to 275° C., thereby yielding an imide oligomer.

Examples of the solvent include organic solvents such as N-methyl-2-pyrrolidone (NMP), N,N-dimethylacetamide (DMAc), N,N-diethylacetamide, N-methylcaprolactam, γ-butyrolactone (GBL), and cyclohexanone. These solvents may be used singly or in combination of two or more of them. These solvents can be selected based on known arts about soluble polyimides.

A preferred resin-transfer-moldable terminal-modified imide oligomer of the present invention can be produced, for example, as below.

First, an aromatic diamine including 2-phenyl-4,4'-diaminodiphenyl ether is homogeneously dissolved in the solvent described above, then a predetermined amount of an aromatic tetracarboxylic dianhydride including 3,3',4,4'-biphenyltetracarboxylic dianhydride or 1,2,4,5-benzenetetracarboxylic dianhydride is added to the solution and homogeneously dissolved, and the mixture is stirred at a reaction temperature of about 5 to 60° C. for about 1 to 180 minutes. To the reaction solution, 4-(2-phenylethynyl)phthalic anhydride is added and homogeneously dissolved, and then the mixture is reacted at a reaction temperature of about 5 to 60° C. for about 1 to 180 minutes while stirring to thus yield a terminal-modified amide acid oligomer. Subsequently, the reaction solution is stirred at 140 to 275° C. for 5 minutes to 24 hours and this allows the amide acid oligomer to be imidized to yield a terminal-modified imide oligomer. Then, as necessary, the reaction solution is cooled to around room temperature, and consequently, the resin-transfer-moldable terminal-modified imide oligomer of the present invention can be obtained. During the reaction, the whole reaction steps or some reaction steps are preferably carried out in an atmosphere of an inert gas such as nitrogen gas and argon gas or in vacuo.

The resin-transfer-moldable terminal-modified imide oligomer prepared in this manner can be isolated as a powder product by pouring the reaction solution in water, for example. The resin-transfer-moldable terminal-modified imide oligomer can be used as a solid, for example, a powder, at ambient temperature (23° C.).

The resin-transfer-moldable terminal-modified imide oligomer obtained has little possibility of undergoing hydrolysis and thus can be stably stored for a long period of time without the reduction in viscosity and other properties as compared with an amide acid oligomer.

<Resin-Transfer-Moldable Terminal-Modified Imide Oligomer Mixture>

The present invention may be a resin-transfer-moldable terminal-modified imide oligomer mixture including the particular resin-transfer-moldable terminal-modified imide oligomer of the present invention above.

The present invention may be a resin-transfer-moldable terminal-modified imide oligomer mixture including the resin-transfer-moldable terminal-modified imide oligomer having a residue of a tetravalent aromatic tetracarboxylic acid and represented by General Formula (1) and a terminal-modified imide oligomer represented by General Formula (4). This allows the mixture to obtain excellent high temperature flowability and good resin transfer moldability.

[C.8]

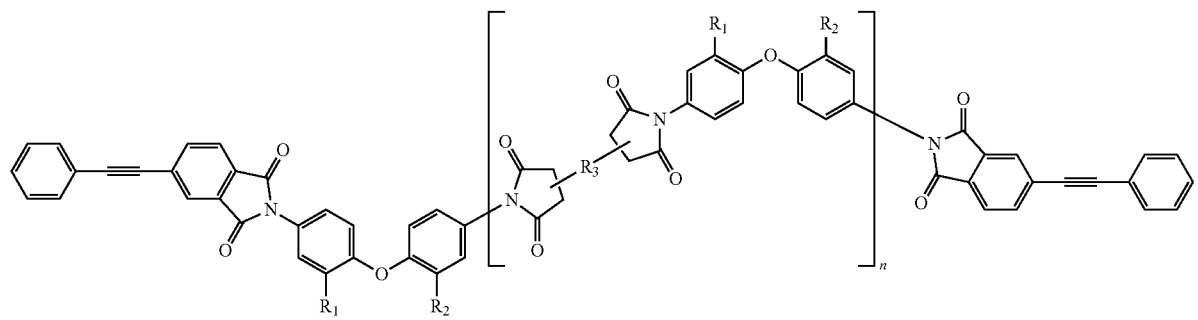

General Formula (1)

ticular resin-transfer-moldable terminal-modified imide oligomer having a residue of a tetravalent aromatic tetracarboxylic acid and represented by General Formula (1) and a terminal-modified imide oligomer represented by General Formula (1) where n is 0. This allows the terminal-modified imide oligomer mixture to obtain excellent high temperature flowability and good resin transfer moldability.

Such a mixture can be obtained by mixing the particular resin-transfer-moldable terminal-modified imide oligomer having a residue of a tetravalent aromatic tetracarboxylic acid and represented by General Formula (1) and a terminal-modified imide oligomer represented by General Formula (1) where n is 0 (including an oligomer where n is 0 alone and having no residue of a tetravalent aromatic tetracarboxylic acid) by a known method. The mixing ratio of both imide oligomers is not particularly limited and can be appropriately selected so as to achieve intended physical properties. From the viewpoint of the toughness of a cured resin or a fiber-reinforced cured resin after molding described later, the mixing ratio (A/B) of the particular resin-transfer-moldable terminal-modified imide oligomer (A) having a residue of a tetravalent aromatic tetracarboxylic acid and represented by General Formula (1) and the terminal-modified imide oligomer (B) represented by General Formula (1) where n is 0 is preferably 9/1 to 4/6.

The terminal-modified imide oligomer represented by General Formula (1) where n is 0 can be produced in accordance with the production method of the resin-transfer-mold- In General Formula (1), $R_1$ and $R_2$ are a hydrogen atom or an aromatic hydrocarbon group having 6 to 10 carbon atoms, and one of $R_1$ and $R_2$ is the aromatic hydrocarbon group having 6 to 10 carbon atoms. $R_3$ is an aromatic organic group surrounded by four carbonyl groups in the aromatic tetracarboxylic acid, and for a formula where n is 2 or more, $R_3$s are optionally the same as or different from each other. n is an integer of 0 or more and 6 or less. The aromatic hydrocarbon group having 6 to 10 carbon atoms is not particularly limited but is preferably an aromatic hydrocarbon group (phenyl group) having 6 carbon atoms. Using the phenyl group as the aromatic hydrocarbon group having 6 to 10 carbon atoms can achieve excellent chemical bond stability and heat resistance and improve physical heat resistance as described above.

[C.9]

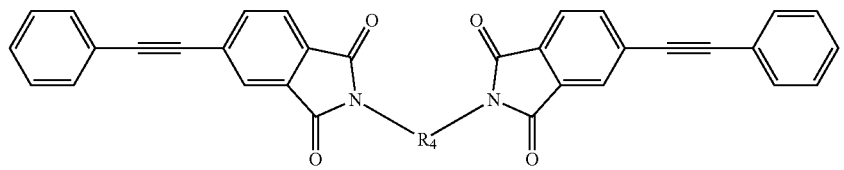

General Formula (4)

In General Formula (4), $R_4$ is an aromatic organic group surrounded by two amino groups in an aromatic diamine.

The imide oligomer represented by General Formula (4) has a minimum melt viscosity of 1 Pa·sec or less determined with a rheometer described later. The minimum melt viscosity is preferably 0.5 Pa·sec or less and more preferably 0.3 Pa·sec or less. The mixture obtained by using such a terminal-modified imide oligomer represented by General Formula (4) obtains excellent properties such as melt flowability while utilizing the characteristics of the resin-transfer-moldable terminal-modified imide oligomer of the present invention.

The terminal-modified imide oligomer represented by General Formula (4) is not particularly limited as long as it has the properties, and can be exemplified by first to third embodiments below.

In the first embodiment of the terminal-modified imide oligomer represented by General Formula (4), examples of the aromatic diamine capable of constituting the aromatic organic group represented by $R_4$ include 2-phenyl-4,4'-diaminodiphenyl ether, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodiphenyl ether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, and 9,9-bis(4-(4-aminophenoxy)phenyl)fluorene.

The mixture obtained by using such a terminal-modified imide oligomer represented by General Formula (4) obtains excellent properties such as melt flowability while utilizing the characteristics (for example, mechanical properties of a cured resin, a fiber-reinforced resin, or other products to be obtained) of the resin-transfer-moldable terminal-modified imide oligomer of the present invention.

The second embodiment of the terminal-modified imide oligomer represented by General Formula (4) includes the resin-transfer-moldable terminal-modified imide oligomer of the present invention as above. However, the second embodiment substantially has meaning when the mixture includes different types of the resin-transfer-moldable terminal-modified imide oligomers. The mixture including the same imide oligomer is naturally included in the present invention.

Using substantially a plurality of the resin-transfer-moldable terminal-modified imide oligomers of the present invention as above can yield the resin-transfer-moldable terminal-modified imide oligomer mixture, utilizing the characteristics of each oligomer.

The third embodiment of the terminal-modified imide oligomer represented by General Formula (4) includes an imide oligomer having a residue of a tetravalent aromatic tetracarboxylic acid and represented by General Formula (1) where the 2-phenyl-4,4'-diaminodiphenyl ether is replaced with another aromatic diamine. Examples of the aromatic diamine include, but are not limited to, 1,4-diaminobenzene, 1,3-diaminobenzene, 1,2-diaminobenzene, 2,6-diethyl-1,3-diaminobenzene, 4,6-diethyl-2-methyl-1,3-diaminobenzene, 3,5-diethyltoluene-2,6-diamine, 4,4'-diaminodiphenyl ether (4,4'-ODA), 3,4'-diaminodiphenyl ether (3,4'-ODA), 3,3'-diaminodiphenyl ether, 3,3'-diaminobenzophenone, 4,4'-diaminobenzophenone, 3,3'-diaminodiphenylmethane, 4,4'-diaminodiphenylmethane, bis(2,6-diethyl-4-aminophenyl)methane, 4,4'-methylene-bis(2,6-diethylaniline), bis(2-ethyl-6-methyl-4-aminophenyl)methane, 4,4'-methylene-bis(2-ethyl-6-methylaniline), 2,2-bis(3-aminophenyl)propane, 2,2-bis(4-aminophenyl)propane, 1,3-bis(4-aminophenoxy)benzene, 1,3-bis(3-aminophenoxy)benzene, 1,4-bis(4-aminophenoxy)benzene, 1,4-bis(3-aminophenoxy)benzene, benzidine, 3,3'-dimethylbenzidine, 2,2-bis(4-aminophenoxy)propane, 2,2-bis(3-aminophenoxy)propane, 2,2-bis[4'-(4"-aminophenoxy)phenyl]hexafluoropropane, 9,9-bis(4-aminophenyl)fluorene, and 9,9-bis(4-(4-aminophenoxy)phenyl)fluorene.

The mixture obtained by using the terminal-modified imide oligomer of the third embodiment obtains excellent high temperature flowability and good resin transfer moldability while utilizing the characteristics (for example, mechanical properties of a cured resin, a fiber-reinforced resin, or other products to be obtained) of the particular resin-transfer-moldable terminal-modified imide oligomer having a residue of a tetravalent aromatic tetracarboxylic acid and represented by General Formula (1) of the present invention.

The resin-transfer-moldable terminal-modified imide oligomer mixture of the present invention may include a terminal-modified imide oligomer represented by General Formula (4) or two or more of them.

An example of the mixture includes the resin-transfer-moldable terminal-modified imide oligomer of the present invention and one or more of the terminal-modified imide oligomers represented by General Formula (4) in the first to third embodiments.

More specifically, examples of the mixture including the terminal-modified imide oligomer represented by General Formula (4) of the second embodiment include a mixture using the particular resin-transfer-moldable terminal-modified imide oligomer represented by General Formula (2) and the particular resin-transfer-moldable terminal-modified imide oligomer represented by General Formula (3).

The resin-transfer-moldable terminal-modified imide oligomer mixture of the present invention may have any mixing ratio of the particular resin-transfer-moldable terminal-modified imide oligomer represented by General Formula (1) and the terminal-modified imide oligomer represented by General Formula (4) within the range not impairing the melt flowability and the mechanical properties of a cured resin or a fiber-reinforced cured resin to be finally obtained.

For a mixture using the terminal-modified imide oligomer represented by General Formula (4) of the first embodiment, the amount of the terminal-modified imide oligomer represented by General Formula (4) is preferably 1 part by weight or more, more preferably 5 parts by weight or more, and even more preferably 10 parts by weight or more, with respect to 100 parts by weight of the particular resin-transfer-moldable terminal-modified imide oligomer having a residue of a tetravalent aromatic tetracarboxylic acid and represented by General Formula (1). This produces excellent effects of imparting high moldability (melt flowability) without loss of high mechanical properties.

For a mixture using the terminal-modified imide oligomer represented by General Formula (4) of the second embodiment, the mixing ratio is not particularly limited and can be appropriately set in consideration of the melt flowability during molding and the mechanical properties of a cured resin and a fiber-reinforced cured resin to be finally obtained.

For a mixture using the terminal-modified imide oligomer represented by General Formula (4) of the third embodiment, the mixing ratio of the terminal-modified imide oligomer represented by General Formula (4) is preferably 10 parts by weight or more and more preferably 20 parts by weight or more with respect to 100 parts by weight of the particular resin-transfer-moldable terminal-modified imide oligomer represented by General Formula (1). This allows the terminal-modified imide oligomer mixture to obtain excellent high temperature flowability and good resin transfer moldability.

The resin-transfer-moldable terminal-modified imide oligomer mixture of the present invention preferably has a melt viscosity of 3 Pa sec or less at 280 to 350° C.

The terminal-modified imide oligomer represented by General Formula (4) used in the present invention (except the second embodiment) can be produced as below, for example, but the method is not limited to the example.

For example, an aromatic diamine and 4-(2-phenylethynyl)phthalic anhydride are used so that the total amount of amino group is half or less the total amount of acid anhydride group of the whole component (2 mol of adjacent carboxy groups are regarded as 1 mol of acid anhydride group), and each component is polymerized in the solvent described above at a reaction temperature of about 100° C. or less, particularly, 80° C. or less to thus yield an "oligomer having an amide-acid bond" (amide acid oligomer, also called amic acid oligomer). Next, the amide acid oligomer is dehydrated and cyclized by a method of adding an imidizing agent at a low temperature of about 0 to 140° C. or a method of heating the oligomer at a high temperature of 140 to 275° C., thereby yielding an imide oligomer. As necessary, the product may be poured into a poor solvent such as water and an alcohol to thus yield a powder. The imidizing agent is not specifically limited and a known agent can be used.

Any method can be employed for producing the mixture of the particular resin-transfer-moldable terminal-modified imide oligomer having a residue of a tetravalent aromatic tetracarboxylic acid and represented by General Formula (1) and the terminal-modified imide oligomer represented by General Formula (4). Examples of the method include a method (i) of adding the terminal-modified imide oligomer represented by General Formula (4) to the particular resin-transfer-moldable terminal-modified imide oligomer having a residue of a tetravalent aromatic tetracarboxylic acid and represented by General Formula (1) and a method (ii) of mixing "oligomers in a state having an amide-acid bond" so as to yield the mixture of the particular resin-transfer-moldable terminal-modified imide oligomer having a residue of a tetravalent aromatic tetracarboxylic acid and represented by General Formula (1) and the terminal-modified imide oligomer represented by General Formula (4). Among them, the method (i) is preferred from the viewpoint of productivity. The form during the addition (mixing) of each oligomer is not particularly limited, and the terminal-modified imide oligomer may be mixed in a solution form or in a powder form, for example. The mixing ratio can be appropriately selected so as to give the resin-transfer-moldable terminal-modified imide oligomer mixture with the intended mixing ratio above.

<Varnish>

The present invention may be a varnish by using the resin-transfer-moldable terminal-modified imide oligomer or the resin-transfer-moldable terminal-modified imide oligomer mixture. In the present invention, the varnish means what is called a spirit varnish or an oil varnish. The spirit varnish is, for example, prepared by dissolving the terminal-modified imide oligomer or the terminal-modified imide oligomer mixture of the present invention in a solvent. The oil varnish is, for example, prepared by heating and melting the terminal-modified imide oligomer or the terminal-modified imide oligomer mixture of the present invention together with an drying oil, then adding a desiccant, and diluting the mixture with a solvent.

Examples of the varnish form include, but are not necessarily limited to, a solution form, a paste form, a gel form, and a sol form.

Examples of the solvent usable for the spirit varnish include, but are not necessarily limited to, organic solvents such as N-methyl-2-pyrrolidone (NMP), N,N-dimethylacetamide (DMAc), N,N-diethylacetamide, N-methylcaprolactam, γ-butyrolactone (GBL), and cyclohexanone. These solvents may be used singly or in combination of two or more of them. These solvents can be selected in accordance with known arts on soluble polyimides.

The amount of the resin-transfer-moldable terminal-modified imide oligomer or the resin-transfer-moldable terminal-modified imide oligomer mixture in the spirit varnish is not particularly limited and can be appropriately set depending on an intended application.

The solvent usable for the oil varnish is not particularly limited and the same solvents as those used in the spirit varnish can be used. The drying oil and the desiccant may be those typically used in an oil varnish. The oil varnish may have any composition of each component and the composition can be appropriately set depending on an intended application.

The varnish of the present invention, in which the resin-transfer-moldable terminal-modified imide oligomer of the present invention has little possibility of undergoing hydrolysis as described above, can be stably stored for a long period of time without the reduction in viscosity and other properties as compared with, for example, an amide acid oligomer.

<Cured Resin>

A cured resin of the present invention can be obtained by resin transfer molding of transferring the resin-transfer-moldable terminal-modified imide oligomer, the resin-transfer-moldable terminal-modified imide oligomer mixture, or the varnish in a molten state into a mold and thermal curing the component.

More specifically for example, the resin-transfer-moldable terminal-modified imide oligomer, the resin-transfer-moldable terminal-modified imide oligomer mixture in a powder form, or the varnish, for example, in a paste form is previously melted at a temperature of 200 to 300° C., then the melted material is transferred and filled into a mold such as a metal mold in a decompressed condition such as a vacuum or in a pressurized condition, and the component is heated and cured at 280 to 500° C. for about 10 minutes to 40 hours. Such resin transfer molding enables the production of the cured resin of the present invention.

The cured resin may have any shape and can be formed into various shape (for example, a film shape and a plate shape) required in industrial products as long as the shape can be formed by resin transfer molding.

The cured resin of the present invention preferably has a glass transition temperature (Tg) of 300° C. or more. The glass transition temperature (Tg) is determined by the method described later.

The cured resin of the present invention preferably has a tensile elongation at break of 8% or more. The tensile elongation at break is determined by the method described later.

The cured resin having the physical properties as above can be used as a forming material in a field requiring high heat resistance.

<Fiber-Reinforced Cured Resin>

A fiber-reinforced cured resin of the present invention is obtained by resin transfer molding of impregnating a fiber that is previously disposed (preformed) in a mold with the resin-transfer-moldable terminal-modified imide oligomer, the resin-transfer-moldable terminal-modified imide oligomer mixture, or the varnish in a molten state and thermal curing the component.

The mold (forming die) in which a fiber is previously disposed is not particularly limited and may be a mold into which the terminal-modified imide oligomer or other components can be transferred in a molten state. Examples of the mold include a common mold made of metal (metal mold) and a mold made of a synthetic resin having high heat resistance, such as polyimide. The synthetic resin mold may be, for example, a forming die formed so as to hermetically seal the fiber (except a line for transferring a melted oligomer or other materials and a line for decompression provided as necessary) by using a sheet-like molded article.

The fiber applicable to the present invention is not particularly limited, and for example, inorganic fibers such as a carbon fiber, a glass fiber, a metal fiber, and a ceramic fiber and organic synthetic fibers such as a polyamide fiber, a polyester fiber, a polyolefin fiber, and a novoloid fiber can be used in combination. In particular, in order to achieve excellent mechanical strength, a carbon fiber is desired. The carbon fiber contains carbon in an amount ranging from 85 to 100% by weight and is a continuous fibrous material at least partially having a graphite structure. Examples include, but are not necessarily limited to, a polyacrylonitrile (PAN) carbon fiber, a rayon carbon fiber, a lignin carbon fiber, and a pitch carbon fiber. A PAN carbon fiber or a pitch carbon fiber is preferably used because such a carbon fiber is widely used and inexpensive and has high strength. The carbon fiber, which is typically subjected to sizing treatment, may be used without treatment or may be washed with an organic solvent, as necessary. A fiber bundle is preferably subjected to opening by air, a roller, or other means in advance so as to fill space in single yarns of the carbon fiber with a resin.

The shape of the fiber material constituting the fiber-reinforced composite material is a continuous fibrous structure including, for example, UD, weave (such as plain weave and sateen weave), and knit. The shape is not particularly limited and can be appropriately selected depending on an intended purpose. These shapes may be used singly or in combination.

The fiber-reinforced cured resin of the present invention can be obtained as below, for example.

The resin-transfer-moldable terminal-modified imide oligomer, the resin-transfer-moldable terminal-modified imide oligomer mixture in a powder form, or the varnish, for example, in a paste form is melted at a temperature of 200 to 280° C., then the melted material is transferred into a mold such as a metal mold in which a reinforced fiber is previously disposed in a pressurized or decompressed condition to thus impregnate the fiber, and the material is heated and cured at 280 to 500° C. for about 10 minutes to 40 hours. Such resin transfer molding enables the production of the fiber-reinforced cured resin.

The fiber-reinforced cured resin of the present invention obtained as above preferably has a glass transition temperature (Tg) of 300° C. or more. The glass transition temperature (Tg) is determined by the method described later.

EXAMPLES

Examples will be described hereinafter in order to explain the present invention but are not intended to limit the present invention. Each property was determined in the following condition.

<Test Method>

(1) 5% weight loss temperature: determined with SDT-2960 thermogravimetric analyzer (TGA) manufactured by TA Instruments under a nitrogen stream at a rate of temperature rise of 5° C./min.

(2) Glass transition temperature of cured product: for a cured resin, determined with DSC-2010 differential scanning calorimeter (DSC) manufactured by TA Instruments under a nitrogen stream at a rate of temperature rise of 5° C./min; for a fiber-reinforced cured resin, determined with DMA-Q800 dynamic mechanical analyzer (DMA) (cantilever mode) manufactured by TA Instruments under an air stream at a rate of temperature rise of 3° C./min and a frequency of 1 Hz.

(3) Minimum melt viscosity: determined with AR2000 rheometer manufactured by TA Instruments on a 25-mm parallel plate at a rate of temperature rise of 4° C./min.

(4) Isothermal melt viscosity at 300° C.: determined with AR2000 rheometer manufactured by TA Instruments.

(5) Elasticity modulus, breaking strength, tensile elongation at break: determined with TENSILON/UTM-II-20 manufactured by ORIENTEC Co, Ltd. at room temperature at a tensile speed of 3 mm/min. A specimen had a film shape with a length of 20 mm, a width of 3 mm, and a thickness of 80 to 120 μm.

(6) GPC analysis: performed with GPC analyzer manufactured by Waters Corporation using chloroform as a mobile phase. A polystyrene standard commercially available from Aldrich was used for molar weight calibration.

Example 1

Into a 100-mL three-necked flask equipped with a thermometer, a stirring bar, and a nitrogen inlet line, 4.4181 g (16 mmol) of 2-phenyl-4,4'-diaminodiphenyl ether and 20 mL of N-methyl-2-pyrrolidone were added and dissolved. Then, 1.7450 g (8 mmol) of 1,2,4,5-benzenetetracarboxylic dianhydride and 3 mL of N-methyl-2-pyrrolidone were added and the mixture was polymerized under a nitrogen stream at room temperature for 2.5 hours to yield an amide acid oligomer. To the reaction solution, 3.9717 g (16 mmol) of 4-(2-phenylethynyl)phthalic anhydride was added and the mixture was reacted under a nitrogen stream at room temperature for 18 hours, thereby modifying the terminals. The mixture was further stirred at 195° C. for 5 hours and this formed an imide bond.

The reaction mixture was cooled and then was poured into 900 mL of ion-exchanged water. The precipitated powder was filtered off. The powder obtained by filtration was dried at 180° C. for a day under reduced pressure to thus yield a product. The obtained terminal-modified imide oligomer is represented by General Formula (2) where $R_1$ and $R_2$ are a hydrogen atom or a phenyl group and one of $R_1$ and $R_2$ is the phenyl group. The average n was 1.

[C.10]

General Formula (2)

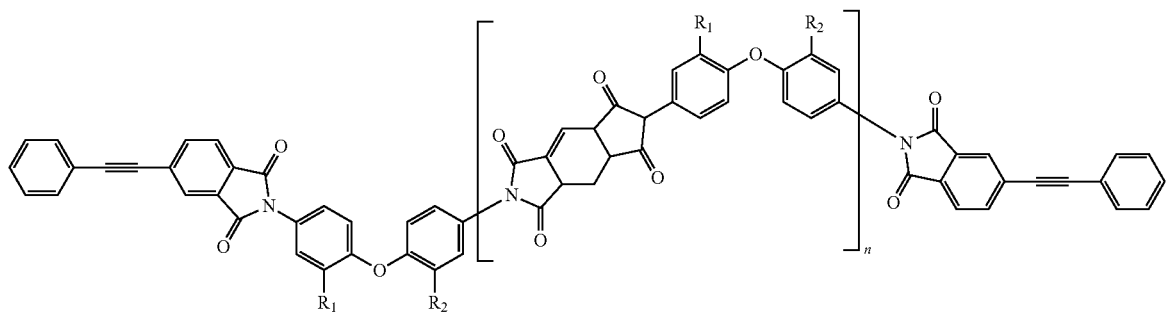

(In Formula, n is an integer of 0 or more and 6 or less)

The obtained terminal-modified imide oligomer (uncured product) was soluble in an NMP solvent in an amount of 30% or more at room temperature. The NMP solution (varnish) dissolving the terminal-modified imide oligomer in an amount of 30% by weight failed to form gel even after a month. The powdery terminal-modified imide oligomer before curing had a minimum melt viscosity of 0.8 Pa·sec (325° C.). The terminal-modified imide oligomer had an isothermal melt viscosity of 3 Pa·sec or less at 280° C. from 0 to 60 minutes. The amount of a component where n was 0 was calculated from the area intensity ratio of peaks detected by GPC analysis (mobile phase:chloroform), resulting in about 30% in the whole terminal-modified imide oligomers produced.

The powdery terminal-modified imide oligomer was melted at a temperature of 300° C., then transferred into a mold, and heated at 370° C. for 1 hour. Thus obtained film-like cured resin (a thickness of 80 μm) had a glass transition temperature (Tg) of 367° C. (DSC) and a 5% weight loss temperature of 528° C. with TGA. Mechanical properties of the film-like cured resin were determined by tensile test, resulting in an elasticity modulus of 3.08 GPa, a breaking strength of 121 MPa, and a tensile elongation at break of 12%.

Comparative Example 1

Into a 100-mL three-necked flask equipped with a thermometer, a stirring bar, and a nitrogen inlet line, 3.203 g (16 mmol) of 4,4'-diaminodiphenyl ether and 20 mL of N-methyl-2-pyrrolidone were added and dissolved. Then, 1,2,4,5-benzenetetracarboxylic dianhydride g (8 mmol) and 3 mL of N-methyl-2-pyrrolidone were added and the mixture was polymerized under a nitrogen stream at room temperature for 2.5 hours to yield an amide acid oligomer. To the reaction solution, 3.9717 g (16 mmol) of 4-(2-phenylethynyl)phthalic anhydride was added and the mixture was reacted under a nitrogen stream at room temperature for 18 hours, thereby modifying the terminals. The mixture was further stirred at 195° C. for 5 hours and this formed an imide bond. During the imidization, the precipitation of imide oligomer was observed.

The reaction mixture was cooled and then was poured into 900 mL of ion-exchanged water. The precipitated powder was filtered off. The powder was washed with 60 mL of methanol for 30 minutes and the powder obtained by filtration was dried at 180° C. for a day under reduced pressure to thus yield a product. The obtained terminal-modified imide oligomer is represented by General Formula (5) and the average n was 1.

[C.11]

General Formula (5)

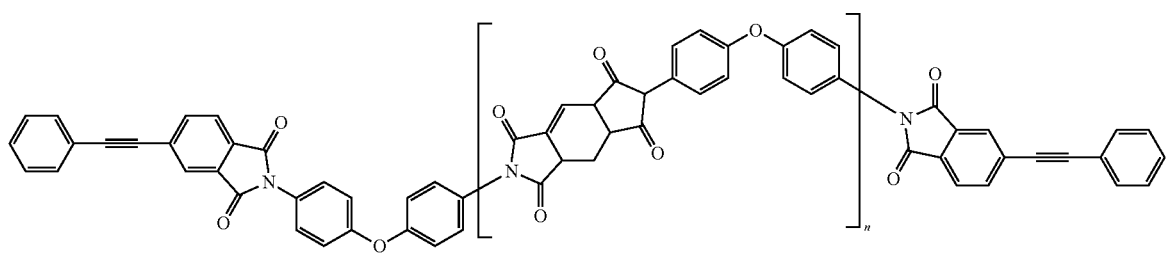

(In Formula, n is an integer of 0 or more and 6 or less)

The powdery terminal-modified imide oligomer (uncured product) obtained was insoluble in an NMP solvent. The powdery terminal-modified imide oligomer showed no melt flowability even at 300° C. or more and thus failed to produce a good molded article (film-like cured product).

Example 2

Into a 100-mL three-necked flask equipped with a thermometer, a stirring bar, and a nitrogen inlet line, 4.4181 g (16 mmol) of 2-phenyl-4,4'-diaminodiphenyl ether and 20 mL of N-methyl-2-pyrrolidone were added and dissolved. Then, 2.352 g (8 mmol) of 3,3',4,4'-biphenyltetracarboxylic dianhydride and 3 mL of N-methyl-2-pyrrolidone were added and the mixture was polymerized under a nitrogen stream at room temperature for 2.5 hours to yield an amide acid oligomer. To the reaction solution, 3.9717 g (16 mmol) of 4-(2-phenylethynyl)phthalic anhydride was added and the mixture was reacted under a nitrogen stream at room temperature for 18 hours, thereby modifying the terminals. The mixture was further stirred at 195° C. for 5 hours and this formed an imide bond.

The reaction mixture was cooled and then was poured into 900 mL of ion-exchanged water. The precipitated powder was filtered off. The powder obtained by filtration was dried at 180° C. for a day under reduced pressure to thus yield a product. The obtained terminal-modified imide oligomer is represented by General Formula (3) where $R_1$ and $R_2$ are a hydrogen atom or a phenyl group and one of $R_1$ and $R_2$ is the phenyl group. The average n was 1.

[C.12]

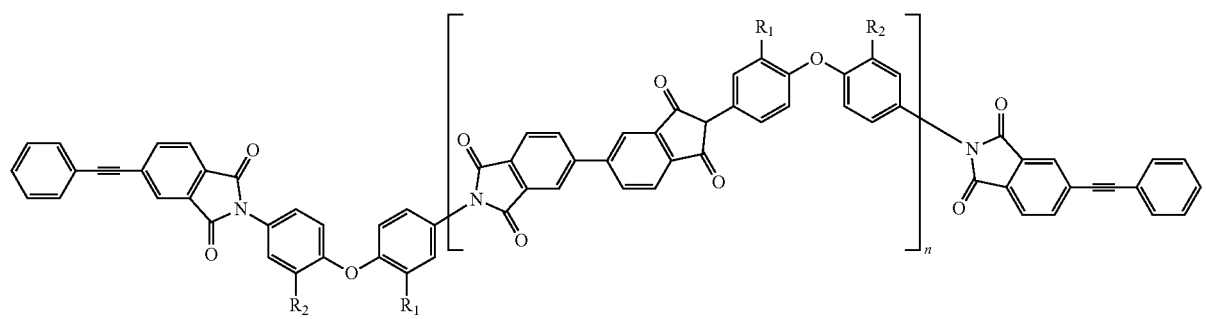

General Formula (3)

(In Formula, n is an integer of 0 or more and 6 or less)

The obtained terminal-modified imide oligomer (uncured product) was soluble in an NMP solvent in an amount of 30% or more at room temperature. The NMP solution (varnish) dissolving the terminal-modified imide oligomer in an amount of 30% by weight failed to form gel even after a month. The powdery terminal-modified imide oligomer before curing had a minimum melt viscosity of 0.8 Pa·sec (330° C.). The terminal-modified imide oligomer had an isothermal melt viscosity of 3 Pa·sec or less at 280° C. from 0 to 60 minutes. The amount of a component where n was 0 was calculated from the area intensity ratio of peaks detected by GPC analysis (mobile phase:chloroform), resulting in about 30% in the whole terminal-modified imide oligomer produced.

The powdery terminal-modified imide oligomer was melted at a temperature of 300° C., then transferred into a mold, and heated at 370° C. for 1 hour. Thus obtained film-like cured resin (a thickness of 80 µm) had a glass transition temperature (Tg) of 310° C. (DSC) and a 5% weight loss temperature of 520° C. with TGA.

The film-like cured resin had a tensile elongation at break of 11% by tensile test.

Production Example 1

Into a 100-mL three-necked flask equipped with a thermometer, a stirring bar, and a nitrogen inlet line, 2.2090 g (8 mmol) of 2-phenyl-4,4'-diaminodiphenyl ether and 20 mL of N-methyl-2-pyrrolidone were added and dissolved. Then, 3.9717 g (16 mmol) of 4-(2-phenylethynyl)phthalic anhydride was added and the mixture was reacted under a nitrogen stream at room temperature for 18 hours, thereby modifying the terminals. The mixture was further stirred at 195° C. for 5 hours and this formed an imide bond.

The reaction mixture was cooled and then was poured into 900 mL of ion-exchanged water. The precipitated powder was filtered off. The powder obtained by filtration was dried at 100° C. for a day under reduced pressure to yield a product. The obtained terminal-modified imide oligomer is represented by General Formula (1) where $R_1$ and $R_2$ are a hydrogen atom or a phenyl group, one of $R_1$ and $R_2$ is the phenyl group, and n is 0.

An uncured product of the obtained terminal-modified imide oligomer was soluble in an NMP solvent in an amount of 30% or more at room temperature. The NMP solution (varnish) dissolving the terminal-modified imide oligomer in an amount of 30% by weight failed to form gel even after a month. The powdery terminal-modified imide oligomer before curing had a minimum melt viscosity of 0.1 Pa·sec (313° C.).

Example 3

First, 9 g of terminal-modified imide oligomer prepared in Example 1 and 1 g of terminal-modified imide oligomer prepared in Production Example 1 were homogeneously mixed. The terminal-modified imide oligomer mixture had a minimum melt viscosity of 0.1 Pa·sec (314° C.). The mixture had an isothermal melt viscosity of 10 Pa·sec or less at 300° C. for 0 to 60 minutes.

The obtained terminal-modified imide oligomer mixture was melted at 280° C., then transferred into a mold, and heated at 37° C. for 1 hour. Thus obtained film-like cured resin (a thickness of 100 µm) had a glass transition temperature (Tg) of 371° C. (DSC) and a 5% weight loss temperature of 515° C. with TGA. Mechanical properties of the film-like cured resin were determined by tensile test, resulting in an elasticity modulus of 3.28 GPa, a breaking strength of 111 MPa, and a tensile elongation at break of 9%.

Example 4

Twelve pieces of 15-cm-square carbon fiber plain weave fabrics (IM600-6K plain weave fabrics manufactured by Toho Tenax Co., Ltd., fiber basis weight: 195 g/m²) were washed with acetone to remove a fiber surface treatment (sizing) agent and then were laminated (laminated fiber). Then, 25-cm-square polyimide films 2 and 3 were stacked on the top face and the bottom face of the laminated fiber 1, respectively. Between the films, a meltage inlet line 4 and a vacuum line 5 were interposed, and the polyimide films 2 and 3 that were in contact with each other near the edge of the laminated fiber 1 were bonded to each other with a silicone adhesive to hermetically seal the fiber (FIG. 1). In a resin container, 100 g of terminal-modified imide oligomer prepared in Example 1 was melted at 280° C. Then, some of the meltage was transferred and filled into the polyimide film mold through the meltage inlet line 4 under vacuum. Thus, each carbon fiber plain weave fabric was impregnated with the imide oligomer and then the imide oligomer was cured at 370° C. for 1 hour. The product was released from the mold to yield a plate-like carbon fiber composite material as a fiber-reinforced cured resin, which had no void or empty space in the resin and had no warpage. The carbon fiber composite material had a high glass transition temperature (Tg) of 350° C. or more as with the cured resin of Example 1.

INDUSTRIAL APPLICABILITY

The present invention provides a novel resin-transfer terminal-modified imide oligomer having excellent moldability such as low melt viscosity, a mixture thereof, a varnish thereof, and a cured resin and a fiber-reinforced cured resin that are produced by using the resin-transfer terminal-modified imide oligomer, the mixture thereof, or the varnish thereof and have high thermal and mechanical properties such as heat resistance, elasticity modulus, and tensile strength and elongation. Such a material can be used in various fields requiring easy moldability and high heat resistance, for example, for aircrafts and equipment for aerospace industry.

REFERENCE SIGNS LIST

1 Laminated fiber
2, 3 Polyimide film
4 Inlet line
5 Vacuum line

The invention claimed is:

1. A resin-transfer-moldable terminal-modified imide oligomer mixture comprising:
   a resin-transfer-moldable terminal-modified imide oligomer having a residue of a tetravalent aromatic tetracarboxylic acid and represented by General Formula (1), the resin-transfer-moldable terminal-modified imide oligomer containing an oligomer where n is 0 in an amount of 10% by mol or more and in amount of 50% by mol or less, and
   a terminal-modified imide oligomer represented by General Formula (4) and having a minimum melt viscosity of 1 Pa·sec or less determined with a rheometer:

General Formula (1)

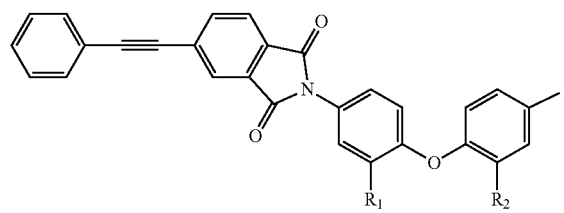

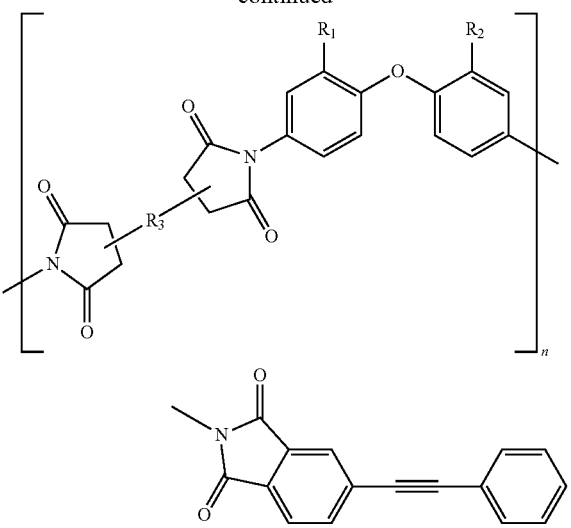

where $R_1$ and $R_2$ are a hydrogen atom or an aromatic hydrocarbon group having 6 to 10 carbon atoms, and at least one of $R_1$ and $R_2$ is the aromatic hydrocarbon group having 6 to 10 carbon atoms; $R_3$ is an aromatic organic group surrounded by four carbonyl groups in the aromatic tetracarboxylic acid, n is an integer of 1 or more and 6 or less, and when n is 2 or more, $R_3$s are optionally the same as or different from each other;

General Formula (4)

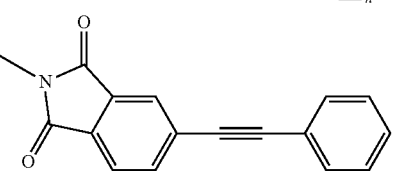

where $R_4$ is an aromatic organic group surrounded by two amino groups in an aromatic diamine.

2. The resin-transfer-moldable terminal-modified imide oligomer mixture according to claim 1 having a melt viscosity of 3 Pa·sec or less at 280 to 350° C.

3. A cured resin obtained by resin transfer molding, the resin transfer molding being performed by transferring the resin-transfer-moldable terminal-modified imide oligomer mixture according to claim 1 into a mold in a molten state and thermal curing the component.

4. A fiber-reinforced cured resin obtained by resin transfer molding, the resin transfer molding being performed by impregnating a fiber previously disposed in a mold with the resin-transfer-moldable terminal-modified imide oligomer mixture according to claim 1 in a molten state and thermal curing the component.

* * * * *